United States Patent
Ruiz Rodriguez et al.

[11] Patent Number: 6,007,937
[45] Date of Patent: Dec. 28, 1999

[54] MULTICELL ELECTRIC STORAGE BATTERY

[75] Inventors: Rafael Ruiz Rodriguez, Guadalajara; Jesús Gutierrez Heredia, Azuqueca de Henares; Ernesto Collado Parra; José Fullea Garcia, both of Madrid, all of Spain

[73] Assignee: Sociedad Espanola del Acumulador Tudor, S.A., Madrid, Spain

[21] Appl. No.: 08/958,278

[22] Filed: Oct. 27, 1997

[30] Foreign Application Priority Data

Jul. 30, 1997 [ES] Spain ............................ 9701689

[51] Int. Cl.⁶ .................. H01M 2/04; H01M 10/50; H01M 2/10; H01M 2/24
[52] U.S. Cl. .................. 429/94; 429/53; 429/120; 429/159; 429/160; 429/158; 429/175; 429/176; 429/179; 429/186
[58] Field of Search ..................... 429/120, 94, 53, 429/158, 159, 160, 175, 176, 179, 186

[56] References Cited

U.S. PATENT DOCUMENTS

| | | | |
|---|---|---|---|
| D. 303,373 | 9/1989 | Ching, Jr. | D13/8 |
| D. 304,926 | 12/1989 | Ching, Jr. | D13/4 |
| D. 304,927 | 12/1989 | Ching, Jr. et al. | D13/4 |
| D. 307,133 | 4/1990 | Ching, Jr. | D13/103 |
| D. 307,886 | 5/1990 | Ching, Jr. et al. | D13/103 |
| 1,362,554 | 12/1920 | Balzano . | |
| 4,383,011 | 5/1983 | McClelland et al. | 429/54 |
| 4,724,190 | 2/1988 | Siga et al. | 429/158 |
| 4,734,341 | 3/1988 | Descroix et al. | 429/62 |
| 4,780,379 | 10/1988 | Puester | 429/59 |
| 4,859,547 | 8/1989 | Adams et al. | 429/121 |
| 5,091,273 | 2/1992 | Hug et al. | 429/94 |
| 5,283,137 | 2/1994 | Ching | 429/175 |
| 5,415,956 | 5/1995 | Ching | 429/187 |
| 5,432,019 | 7/1995 | Hue | 429/10 |
| 5,599,641 | 2/1997 | Ching, Jr. et al. | 429/179 |

FOREIGN PATENT DOCUMENTS

| | | | |
|---|---|---|---|
| 0 314 318 B1 | 3/1995 | European Pat. Off. | H01M 2/24 |
| 0578536 | of 1998 | European Pat. Off. | G11B 33/02 |
| WO 98/50971 | 11/1998 | WIPO | H01M 4/56 |

*Primary Examiner*—John S. Maples
*Attorney, Agent, or Firm*—Darby & Darby

[57] ABSTRACT

A multicell electric storage battery with a prismatic container (1) and cylindrical cells, which comprises through-passing vertical conduits (15–16) opening through the lid and bottom and disposed among adjacent cells and intended for the circulation of air or another coolant and for the passage of threaded anchoring rods (17). The cylindrical walls of the cells include a planar upper segment with an opening through which the electrical connection of adjacent cells is made.

7 Claims, 4 Drawing Sheets

MULTICELL ELECTRIC STORAGE BATTERY

The present U.S. Patent application claims priority from Spanish application No. 9701689 filed Jul. 30, 1997.

The present invention relates to a multicell electric storage battery of the lead-acid type, used, for example, for the starting and semi-propulsion of automotive vehicles.

More specifically, the battery of the invention is of the conventional or recombinant type, whose container is generally right prismatic in shape, closed at the top by a lid through which the connecting terminals protrude, the container being subdivided internally into two or more cylindrical cells housing a positive and a negative electrode isolated by intermediate separators, all of which are wound in a spiral shape.

The current trend in automobiles toward the use of increasingly sophisticated internal and external equipment is generating a demand for ever-greater electrical energy installed in the vehicle, which results in more frequent use of the battery, demanding increasingly high output that discharges the battery more deeply and considerably shortens its life.

The conventional design of the batteries used as energy sources in automobiles consists of a series of cells connected in series, each having a set number of positive and negative electrodes connected in parallel and separated physically by a porous material that permits the free circulation of the ions involved in the electrochemical reactions of charging and discharging.

Due to these growing demands in terms of available power, battery manufacturers have been obliged to increase the number of electrodes per cell, decreasing their thickness, which causes a reduction of service life due to corrosion of the grids serving as supports for the active material in the electrodes. As a result, batteries intended for high power have a very limited service life in terms of cycles and cause premature failures under the more extreme conditions demanded by modern vehicles.

To achieve optimum performance, the cell design must be such that, on the one hand, the surface area of the electrodes can be large, regardless of the number of electrodes, and on the other hand, the active material can be maintained under a given mechanical pressure that keeps it from deteriorating during the charge and discharge cycles.

This design can be implemented by means of cylindrical cells with spiral electrodes, in which the increase in the surface area of the electrode is limited solely by the thickness of the plates and separator. Moreover, the greater the surface area, the greater the internal pressure of the cell, and this pressure remains constant throughout the process owing to the circular geometry of the cell.

New continuous manufacturing techniques permit the large-scale preparation of electrodes of very reduced thickness, and this, combined with automation of the assembly process, makes it possible to achieve the desired cost and performance goals by giving the electrodes a spiral configuration.

The prior art includes examples of storage batteries with cylindrical cells, whose container can assume different configurations depending on the application and the cylindrical shape of the cell. Patents that can be cited in this connection include U.S. Pat. No. 4,383,011, U.S. Pat. No. 4,780,379, U.S. Pat. No. 5,283,137, U.S. Pat. No. 5,415,956, U.S. Pat. No. 5,599,641 and EP 0578536.

Nevertheless, in not one of the patents listed is the container designed so that it can be used directly on conventional automotive vehicles, which require a rectangular, right-prism-shaped battery of standardized dimensions to ensure adequate attachment to the mounting tray and proper electrical connection.

Moreover, one of the problems that arises in the batteries of the type described is the high temperature of the compartment where the battery is installed, due, in the case of the automobile, to the large number of heat-generating devices and the small available space, which greatly decreases the dissipation of heat. The high operating temperature of the battery increases electrode corrosion problems and causes deterioration of the active materials, thereby significantly reducing the life of the battery.

Another problem presented by the batteries of the indicated type derives from the location or position of their connecting terminals. Depending on the structure or design of the automobile or other application, batteries must sometimes be mounted with the positive terminal on the right and sometimes with it on the left. In some cases the terminals must be on top of the lid, and in others on a side of the container.

The object of the present invention is to provide a battery of the initially described type that eliminates the aforesaid disadvantages.

According to the present invention, the batteries comprise vertical throughpassing conduits that open through the lid and bottom and are disposed among adjacent cells. These conduits are designed for the natural or forced circulation of air or another coolant that serves to dissipate the heat of the battery, thereby increasing its service life.

Another object of the present invention is to equip the battery with connecting terminals so disposed that they can be adapted to any type of vehicle, regardless of the arrangement of the positive and negative connectors.

According to the present invention, the battery comprises three connector terminals for each polarity, two of said terminals being disposed in the lid and a third in one of the walls of the container, the three terminals being connected electrically to one another by means of bars or bridges passing over the container, preferably inside the lid.

With the arrangement described, the positive and negative electrical connections to the load can be made indiscriminately on either side of the battery, regardless of the position in which the battery is placed.

Two of the above-discussed coolant conduits passing through the battery, each of which is preferably disposed near one of the smaller walls of the container, are used for the passage of anchoring rods for connection to the tray or soleplate on which the battery will be mounted. This fastening system lends the battery a high resistance to vibration and permits a smooth design for the container, since the traditional projections for anchoring the battery to the tray are no longer necessary. This system facilitates the mounting of the battery for both the manufacturer and the user of the vehicle.

According to a further feature of the invention, the cylindrical walls of the cells comprise a planar upper segment common to adjacent cells. This segment has an opening through which is performed the proper soldering of the connections between the different-polarity leads of these adjacent cells.

This cell connection system further provides the advantage of greater ease of quality control and greater reliability for the storage battery.

A further characteristic of the battery of the invention is that the capacity of the battery can be varied within set limits with the use of containers of the same size. To accomplish this, according to the invention, each cylindrical electrode includes a central core of perforated tubular configuration, the diameter of which defines the electrode capacity that can be housed in the annular chamber delimited by said core and the wall of the cell. The smaller the capacity required of the cell, the larger the diameter of the core. In this way a range of performance characteristics can be obtained without altering the dimensions of the battery, solely by changing the length of the electrodes and the separators, but without any need to modify their thicknesses, to ensure the compression necessary for the satisfactory operation of the storage battery.

In the battery of the invention, the lid comprises handles that facilitate the handling and transport of the battery, these handles being collapsible and able to be housed on the surface of the lid when the battery is mounted or not in use. For this purpose, one or two hinged, symmetrical handles are disposed on the central part of the battery lid and are able to pivot about the hinge point between an idle position, in which they are folded down and fitted in channels formed in the surface of the lid, and a raised, operating position in which they are disposed perpendicular to the lid in order to serve as grips facilitating the transport and handling of the battery.

If the battery is of the recombinant type, the electrolyte will be absorbed in the separator, without complete saturation thereof, in such a way that no free electrolyte is present. Under these conditions the battery can be placed in any position, and thus a single handle arranged on one of the walls of the container can be used for handling and transport. This type of battery includes one valve per cell, designed to ensure the pressure needed to produce the internal recombination of the gases generated during the charging processes.

In short, the characteristics of the invention make it possible to obtain a battery that offers high rate performance and high plate compression, provided by cylindrical cells that guarantee high resistance to charge/discharge cycles, this being a battery that is convenient to handle, easy and safe to fasten or anchor, from which can be imparted a wide range of performance characteristics from its manufacturing process, and that incorporates an internal cell cooling system that prevents the battery from heating up during use, this being a very important advantage for the new applications of batteries in electric or hybrid vehicles, in which heat management of the battery is absolutely essential to ensure rapid recharging and the required acceleration peaks.

All of the foregoing characteristics will be more easily understood from the following description, made with reference to the attached drawings depicting a nonrestrictive exemplary embodiment.

Figure 1:
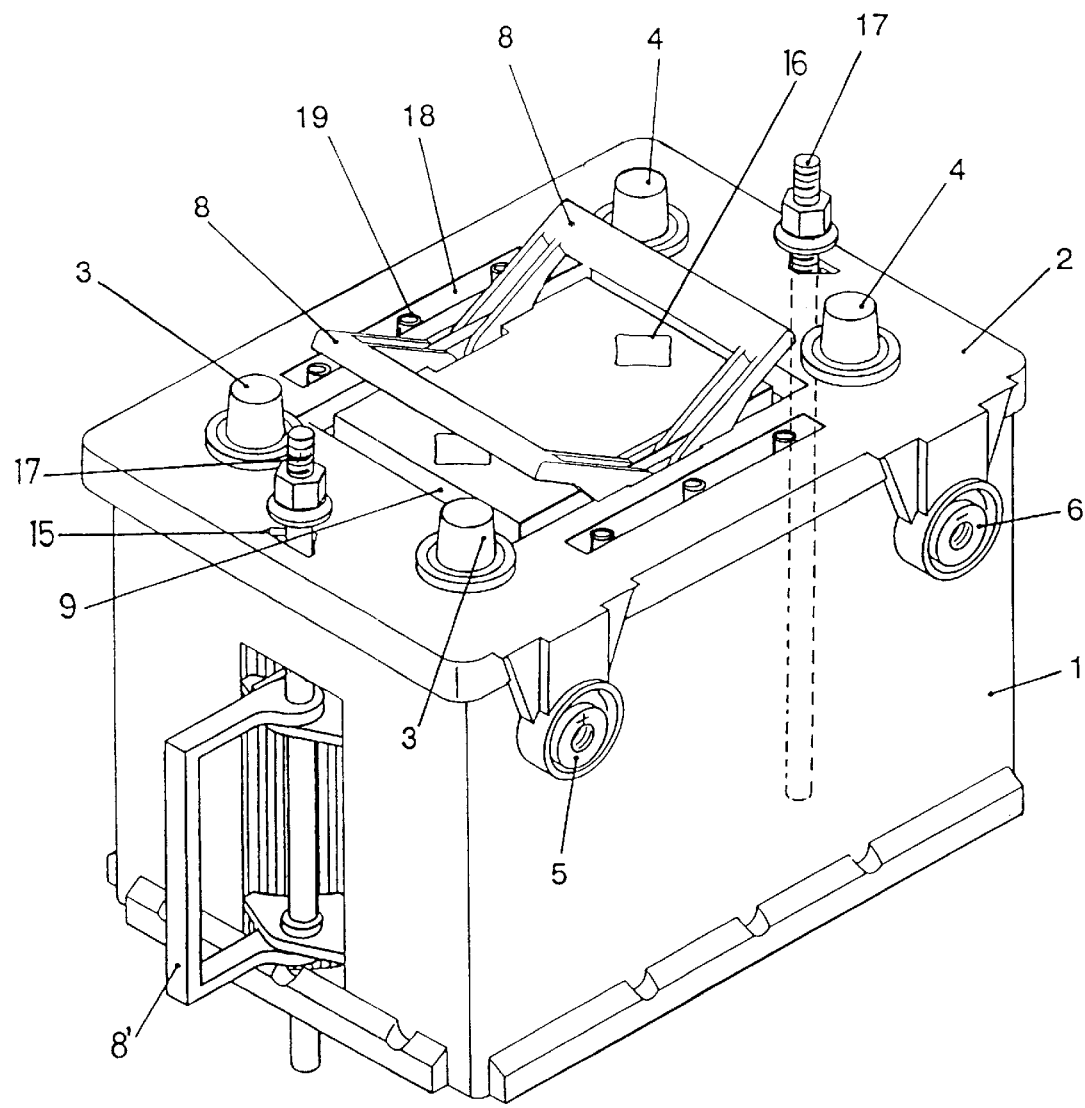
FIG. 1 is a perspective view of a battery realized according to the invention.

The battery depicted in the drawings includes a container 1 of right prismatic configuration and rectangular shape in plan, closed at the top by means of a lid 2.

In the realization shown, the battery includes three terminals for each polarity, two negative terminals designated by reference numeral 3 and two positive terminals designated by reference numeral 4, which project through the lid, and one negative terminal 5 and another positive terminal 6 that project through one of the side walls. Terminals 3 and 5 are connected to one another by means of a bridge or bar that is integrated in the lid 2. In the same manner, terminals 4 and 6, of the same polarity, are connected by another bar or bridge.

Figure 2:
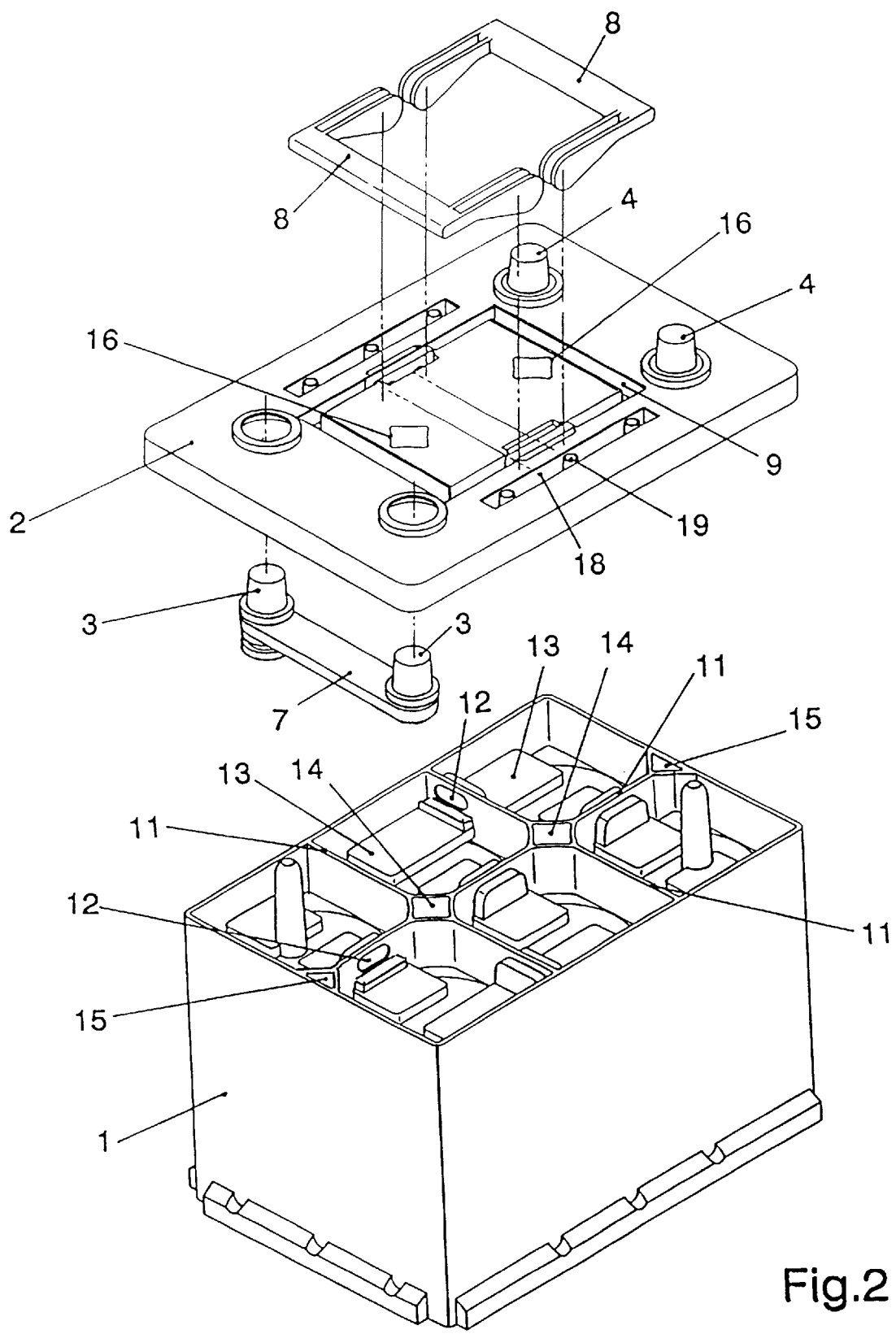
FIG. 2 is a view similar to that of FIG. 1, with the lid taken off.

FIG. 2 shows the bridge 7 that joins terminals 3 of the same polarity. In the case in which the side terminals 5 and 6 are present, the appropriate bridges are extended to connect thereto.

The battery shown in FIGS. 1 and 2 also includes two handles, designated by reference numeral 8, which are hinged to lid 2 at their bottom ends and are able to flip between an operative position, in which the two handles 8 are disposed back to back in a position approximately perpendicular to lid 2, and an inoperative position, in which the handles 8 are folded down onto the lid 2 and are seated in channels 9 formed in the surface of said lid.

Figure 3:
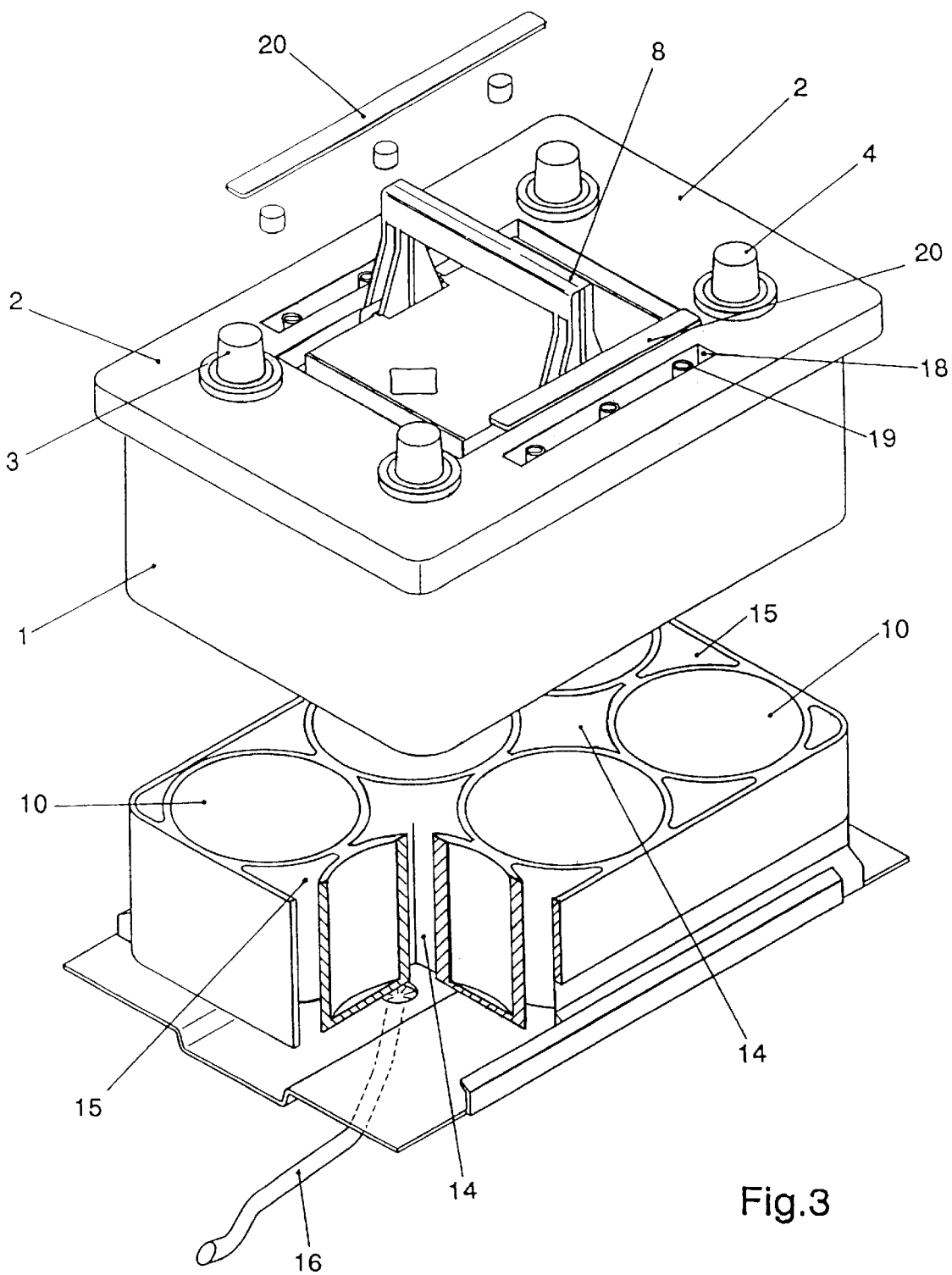
FIG. 3 is a perspective view of a cross section of the battery of the invention, showing the distribution of the cells and the ventilating ducts.

As illustrated in FIG. 3, the battery can include only one handle 8 hinged to lid 2 by the bottom ends of its arms, so that it can assume the positions described hereinabove.

In the case of recombinant batteries containing no free electrolyte, the battery could include a single handle disposed on one of the side walls of the container, as designated by reference numeral 8' in FIG. 1.

As can be seen from FIG. 3, the inside of the container 1 is subdivided into cylindrical cells 10 housing the spirally wound negative and positive electrodes and the corresponding separator. The cylindrical walls of these cells 10 comprise a planar upper segment 11, common to adjacent cells 10, which includes an access opening 12 through which the connection is made between the different-polarity leads 13 of the cells.

According to another characteristic of the invention, fitted conformably between the different cells 10 are vertical conduits 14 and 15 that open through openings 16 in the bottom and lid, defining ventilating ducts through which air or another coolant can circulate, forced air optionally being used, as shown in FIGS. 2 and 3, through a system of coolant supply conduits 16.

Threaded rods 17 for anchoring the battery to the mounting tray can be inserted through the end conduits 15.

As can be seen from FIGS. 1, 2 and 3, disposed in the lid of the battery are slots 18 containing ventilating and acid filling holes 19 and filled with battery acid. These holes further serve to house valves that ensure an adequate internal pressure in each cell, allowing the recombination of gases necessary for a recombinant or valve-regulated type of battery. The slot 18 is subsequently closed by means of the cover bar 20.

The arrangement described yields a cooled battery with high electrical performance characteristics and high resistance to vibration imparted by the anchoring systems, further ensuring absolute leaktightness between cells due to the connecting system described.

One of the problems presented by electric storage batteries in general, and to a more pronounced degree by recombinant-type batteries, is that of ensuring the compression of the stack or set of plates in each cell, which necessitates the use of different-sized containers in order to vary the capacity of the battery, or, in the best possible case, variation of the thickness of the separator in order to achieve this end.

Figure 4:
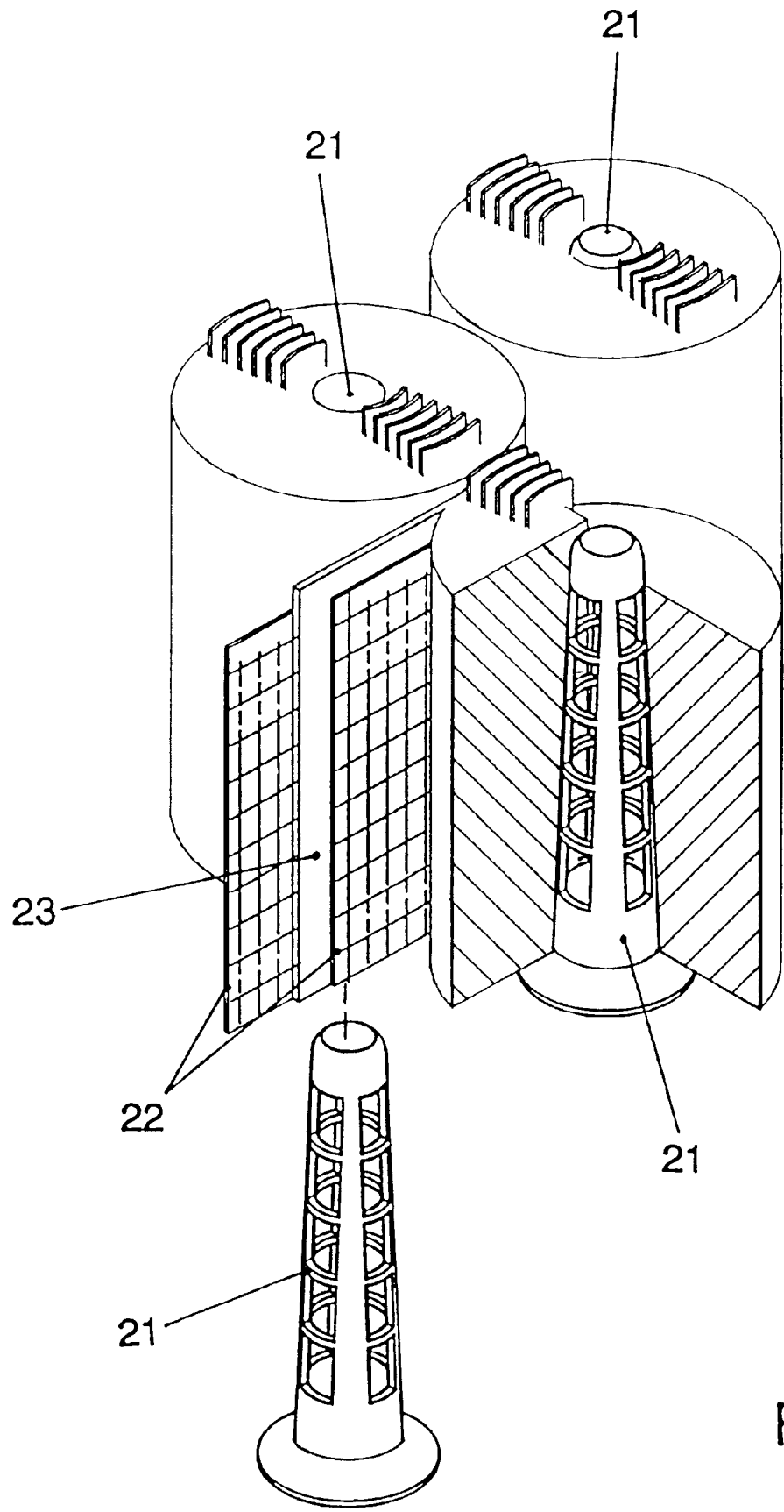
FIG. 4 is a perspective view of the realization of the electrodes housed in each cell.

This problem is solved in the battery of the invention through the use in each cell of a plastic core 21 (FIG. 4) of perforated tubular configuration, onto which the positive and negative electrodes and the separator are wound. This core 21 can have different diameters, thereby defining the electrode capacity that can be housed in the annular chamber delimited between said core and the cylindrical wall of the cell 10, thus making it possible to adjust the length of the positive and negative plates 22 that can be inserted in each fixed-diameter cell, ensuring the compression of the cylindrical stack formed by the electrodes 22 and the separator 23. By increasing the diameter of the core 21 it is possible to manufacture lower-capacity batteries, with shorter plates 22, without the need to use excessively thick separators or resort to a smaller container and lid, the compression of the stack being maintained in order to ensure the proper functioning of the battery.

We claim:

1. A multicell electric storage battery, which comprises a container of generally right prismatic shape and including a top and bottom, closed at the top by means of a lid through which a plurality of connecting terminals protrude, which container is subdivided internally into two or more cylindrical cells including cylindrical walls and housing positive and negative electrodes segregated by intermediate separators, wound in a spiral shape, said positive and negative electrodes creating different polarity leads for adjacent cells, characterized in that the battery comprises vertical throughpassing conduits that open through the lid and the bottom and are disposed among adjacent cells, such conduits are intended for the circulation of air or another coolant and for the passage of threaded rods for anchoring the battery to a mounting tray or a soleplate; and in that the cylindrical walls of the cells comprise a planar upper segment common to adjacent cells, the planar upper segment includes an access opening through which an electrical connection is made between said different-polarity leads of said adjacent cells.

2. A battery according to claim 1, characterized in that the battery comprises three connector terminals for each polarity, two of said terminals being disposed in the lid and one in one of the walls, the three terminals of each polarity being connected electrically by means of a metal bar integrated in the lid.

3. A battery according to claim 1, characterized in that each cylindrical cell includes a central core of perforated tubular configuration, the diameter of which defines the positive and negative electrode capacity housed in an annular chamber delimited between said core and the wall of the cell.

4. A battery according to claim 1, the lid of which carries handles hingedly connected to its central part, which are able to swivel between an idle position in which they are folded down onto the lid in a coplanar position, and a working position in which they are roughly perpendicular to the lid, characterized in that said lid comprises channels in which the handles are housed in their idle position.

5. A battery according to claim 1, having an electrolyte absorbed in the intermediate separators, which is not completely saturated, characterized in that the battery comprises one valve per cell, which ensures the necessary pressure for the internal recombination of gases generated during charging periods.

6. A multicell electric storage battery comprising:

a container including a generally prismatic shape and having a top and a bottom;

the container being subdivided into at least two cylindrical cells, each of the cylindrical cells including a terminal with a polarity based on a positive or negative electrode;

a separator segregating the cylindrical cells;

the battery including a conduit which opens through the top and the bottom and is disposed between adjacent cylindrical cells; and the walls of the cylindrical cells including a planar upper segment common to the adjacent cylindrical cells, the planar upper segment including an access opening through which an electrical connection is made between the different-polarity terminals of the adjacent cylindrical cells.

7. A battery according to claim 1 further comprising electrolyte absorbed in but not completely saturating at least one of the separator and a plurality of plates, and the battery including one valve per each of the cylindrical cells in order to ensure that the necessary pressure for the internal recombination of gases is generated during charging periods.

* * * * *